US011981003B2

(12) United States Patent
Merrill

(10) Patent No.: US 11,981,003 B2
(45) Date of Patent: *May 14, 2024

(54) SYSTEMS AND METHODS FOR SELECTIVELY SECURING A CYLINDRICAL BODY

(71) Applicant: Scott B. Merrill, Lehi, UT (US)

(72) Inventor: Scott B. Merrill, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,897

(22) Filed: Mar. 13, 2023

(65) Prior Publication Data

US 2023/0211472 A1 Jul. 6, 2023

Related U.S. Application Data

(63) Continuation of application No. 17/090,771, filed on Nov. 5, 2020, now Pat. No. 11,602,823, which is a continuation of application No. 16/112,405, filed on Aug. 24, 2018, now Pat. No. 10,857,653.

(60) Provisional application No. 62/549,791, filed on Aug. 24, 2017.

(51) Int. Cl.

| | |
|---|---|
| ***B25B 5/04*** | (2006.01) |
| ***B25B 5/14*** | (2006.01) |
| ***B25B 7/02*** | (2006.01) |
| ***B25B 7/08*** | (2006.01) |

(52) U.S. Cl.

CPC ................ *B25B 5/04* (2013.01); *B25B 5/147* (2013.01); *B25B 7/02* (2013.01); *B25B 7/08* (2013.01)

(58) Field of Classification Search

CPC .. B25B 5/04; B25B 5/147; B25B 5/16; B25B 7/02; B25B 7/08; B25B 9/00; B25B 27/146

See application file for complete search history.

(56) References Cited

U.S. PATENT DOCUMENTS

| | | | |
|---|---|---|---|
| 63,393 | A | 4/1867 | Johnson |
| 150,439 | A | 5/1874 | Smith |
| 166,160 | A | 7/1875 | Topping |
| 304,769 | A | 9/1884 | Whittleton |
| 1,481,517 | A | 1/1924 | Kurz |
| 2,593,201 | A | 4/1952 | Saunders |
| 2,922,209 | A | 1/1960 | Longhi |
| 3,161,085 | A | 12/1964 | Pratt |

(Continued)

*Primary Examiner* — David B. Thomas

(74) *Attorney, Agent, or Firm* — David B. Tingey; K. Russell Griggs; Kirton McConkie

(57) ABSTRACT

At least some implementations of the present invention include the ability to access and secure a compressed riser portion of a pop-up sprinkler. Access is gained through use of the tip of the tool, sloped for access clearance between the sprinkler nozzle "lip" and outer sprinkler base. Once raised from the outer sprinkler casing, the riser is secured in a designated clamping bay or within designated clamping points. This two-pronged approach accommodates varying diameter of sprinkler risers and increases the multi-use function of the tool. The tool's overall inward tension is provided by an engineered compression spring designed with adequate outward tension without making hand compression use of the tool restrictive. Use of the tool in an inward sweeping motion toward the sprinkler allows for raising and clamping the riser in a quick and simple fashion. Thereafter, allowing free and open-hand access for quick and thorough maintenance, repair, exchange or adjustment of the sprinkler nozzle and filter.

9 Claims, 9 Drawing Sheets

(56) References Cited

U.S. PATENT DOCUMENTS

| | | | |
|---|---|---|---|
| 3,973,318 | A | 8/1976 | Strachan |
| 4,063,333 | A | 12/1977 | Schweitzer |
| 4,145,793 | A | 3/1979 | Berlet |
| 4,318,316 | A | 3/1982 | Guilliams |
| 4,614,008 | A | 9/1986 | Brill et al. |
| 4,938,514 | A | 7/1990 | D'Addezio |
| 6,325,432 | B1 | 12/2001 | Sensat |
| 7,111,526 | B1 | 9/2006 | Flojo |
| 7,490,504 | B1 | 2/2009 | Hirsch et al. |
| 8,544,370 | B2 | 10/2013 | Lamar |
| 10,086,506 | B2 | 10/2018 | Pumomohadi et al. |
| 10,112,287 | B2 | 10/2018 | Gallagher |
| 10,144,117 | B2 | 12/2018 | Khristyuchenko et al. |
| 10,391,512 | B1 | 8/2019 | Samuel |
| 10,857,653 | B2 | 12/2020 | Merrill |
| 11,602,823 | B2 | 3/2023 | Merrill |
| 2007/0130775 | A1 | 6/2007 | Holbrook |
| 2012/0151681 | A1 | 6/2012 | Pumodohadi et al. |
| 2014/0331825 | A1 | 11/2014 | Khristyuchenko et al. |
| 2015/0308033 | A1 | 10/2015 | Boocock |
| 2017/0021474 | A1 | 1/2017 | Gallagher |

SYSTEMS AND METHODS FOR SELECTIVELY SECURING A CYLINDRICAL BODY

RELATED APPLICATIONS

This application claims priority to U.S. patent application Ser. No. 17/090,771, which was filed Nov. 5, 2020, and is entitled SYSTEMS AND METHODS FOR SELECTIVELY SECURING A CYLINDRICAL BODY; which claims priority to U.S. patent application Ser. No. 16/112,405, which was filed Aug. 24, 2018, and is entitled SYSTEMS AND METHODS FOR SELECTIVELY SECURING A CYLINDRICAL BODY; which claims priority to U.S. Provisional Patent Application Ser. No. 62/549,791, which was filed Aug. 24, 2017, and is entitled SYSTEMS AND METHODS FOR SELECTIVELY SECURING A CYLINDRICAL BODY; the entire disclosures of which are hereby incorporated by reference.

BACKGROUND OF THE INVENTION

Field of the Invention

The present invention relates to selectively securing a cylindrical body. In particular, at least some implementations of the present invention relate to a device that is configured to selectively provide access to and/or secure a cylindrical riser of a pressurized pop-up water sprinkler head to allow for the adjustment and/or replacement of a sprinkler component, such as a filter and/or nozzle.

Background and Related Art

Pop-up sprinklers have been used by homeowners and commercial business owners and have proven to be reliable and adjustable products that provide effective irrigation to specific landscaped areas. The connection diameter and threading provide a universal fit to existing irrigational piping and fittings. The internal, pop-up portion of the pressurized sprinkler, referred to as a riser, includes a sprinkler nozzle that provides for the necessary directional, distance and volume control of water flow through the use of a customized nozzle. The nozzle is protected from small water carrying debris through the use of an independent filter imbedding in the riser.

Over time, property owners and landscape maintenance professionals may find a need to maintain or exchange the sprinkler nozzle and or nozzle filter due to a change in landscape layout, water direction, water volume, or the obstruction or damage of a nozzle or filter. In order to complete this maintenance, the riser is typically raised and secured against the tension of an internal spring housed in the sprinkler body while the nozzle and/or filter are removed, inspected, and/or re-installed or exchanged.

In many circumstances, completing this maintenance or exchange process is done by an individual using his/her fingers or hands to somehow gain access to the recessed riser, pull up the riser, and secure the riser by hand against its internal spring tension. This leaves the individual with one hand to remove the nozzle and/or filter, sort through replacement parts, and use other tools as necessary while effectively being tethered to the sprinkler at arm's length. This process can prove challenging and can reduce the individual's efficiency and capability. It can also result in minor damage to the user's hand. Additionally, any release of the secured pop-up riser, once the nozzle has been removed, results in the riser recessing below the exposed top portion of the sprinkler, causing increased work time, delays, and frustration. It is possible that repeated slips can damage the sprinkler with the need of replacing the overall sprinkler versus the nozzle and filter components.

Thus, while techniques currently exist that are used to replace sprinkler nozzles and filters, challenges still exist. Accordingly, it would be an improvement in the art to augment or even replace current techniques with other techniques.

SUMMARY OF THE INVENTION

The present invention relates to selectively securing a cylindrical body. In particular, at least some implementations of the present invention relate to a device that is configured to selectively provide access to and/or secure a cylindrical riser of a pressurized pop-up water sprinkler head to allow for the adjustment and/or replacement of a sprinkler component, such as a filter and/or nozzle.

At least some implementations of the present invention allow access to a recessed sprinkler riser by lifting between the nozzle lip and the external sprinkler housing of the sprinkler head, and then extending the riser above the external sprinkler housing. The cylindrical riser is then clamped by the tool, thus holding the riser is an accessible position and allowing the individual to move about in making repairs or completing maintenance. Additionally, at least some implementations of the present invention secure a sprinkler riser that has a diameter in the range of about 0.785 inches to about 1.168 inches with no manual adjustment. At least some implementations of the present invention embrace a tool that eliminates the need for manual adjustment and provides a range of clamping or securing onto a variety of different sized cylindrical bodies.

In at least some implementations, the device is a hand tool that is configured to provide access to a pop-up sprinkler riser and to selectively secure the riser while the nozzle and nozzle filter are removed, maintained, and/or replaced. Accordingly, the hand tool is configured to provide access to a pop-up sprinkler riser from a near flush position with its outer sprinkler body. The hand tool is also configured to selectively secure the sprinkler riser, hand-free, in its extended or raised position, thus allowing for free access to remove, inspect and/or replace the nozzle and imbedded filter or carry out other necessary maintenance. The hand tool can be used to secure a range of pop up riser diameters. Such characteristics increase the flexibility and capabilities of the multi-use tool.

While the methods and processes of the present invention have proven to be particularly useful in the area of accessing and/or securing a sprinkler riser, those skilled in the art can appreciate that the methods and processes can be used in a variety of different applications, with a variety of different cylindrical bodies, and in a variety of different areas of manufacture to yield an effective manner for selectively securing a cylindrical body.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to selectively securing a cylindrical body. In particular, at least some embodiments of the present invention relate to a device that is configured to selectively provide access to and/or secure a cylindrical riser of a pressurized pop-up water sprinkler head to allow for the adjustment and/or replacement of a sprinkler component, such as a filter and/or nozzle.

At least some embodiments allow access to a recessed sprinkler riser by lifting between the nozzle lip and the external sprinkler housing of the sprinkler head, and then extending the riser above the external sprinkler housing. The cylindrical riser is then clamped by the tool, thus holding the riser is an accessible position and allowing the individual to move about in making repairs or completing maintenance. Additionally, while those of ordinary skill in the art will understand that embodiments of the present invention selectively secure cylindrical bodies having any of a variety of diameters, at least some embodiments secure a sprinkler riser that has a diameter in the range of about 0.785 inches to about 1.168 inches with no manual adjustment. Some embodiments secure cylindrical bodies that have smaller diameters. Yet, other embodiments secure cylindrical bodies that have larger diameters. At least some embodiments of the present invention embrace a tool that eliminates the need for manual adjustment and provides a range of clamping or securing onto a variety of different sized cylindrical bodies.

In at least some embodiments, the device is a hand tool that is configured to provide access to a pop-up sprinkler riser and to selectively secure the riser while the nozzle and nozzle filter are removed, maintained, and/or replaced. Accordingly, the hand tool is configured to provide access to a pop-up sprinkler riser from a near flush position with its outer sprinkler body. The hand tool is also configured to selectively secure the sprinkler riser, hand-free, in its extended or raised position, thus allowing for free access to remove, inspect and/or replace the nozzle and imbedded filter or carry out other necessary maintenance. The hand tool can be used to secure a range of pop up riser diameters. Such characteristics increase the flexibility and capabilities of the multi-use tool.

Figure 1:
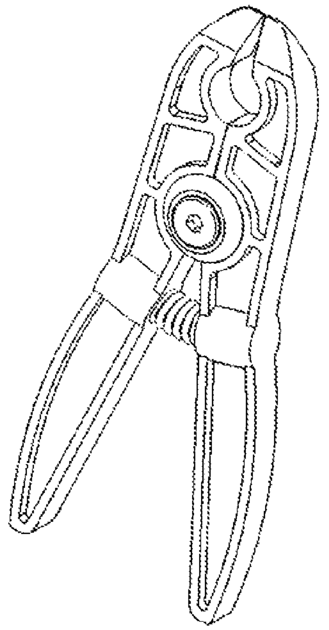
FIG. 1 illustrates a perspective view of a representative embodiment of the present invention in a closed position.

With reference now to FIG. 1, a representative embodiment of the present invention is illustrated in a closed position. The representative embodiment of FIG. 1 is a non-electric hand tool that is configured to selectively secure a cylindrical body. One such example of a cylindrical body is a cylindrical riser of a pop-up sprinkler. The illustrated tool is configured to efficiently maintain, exchange, and/or adjust a sprinkler nozzle and or filter.

Figure 2:
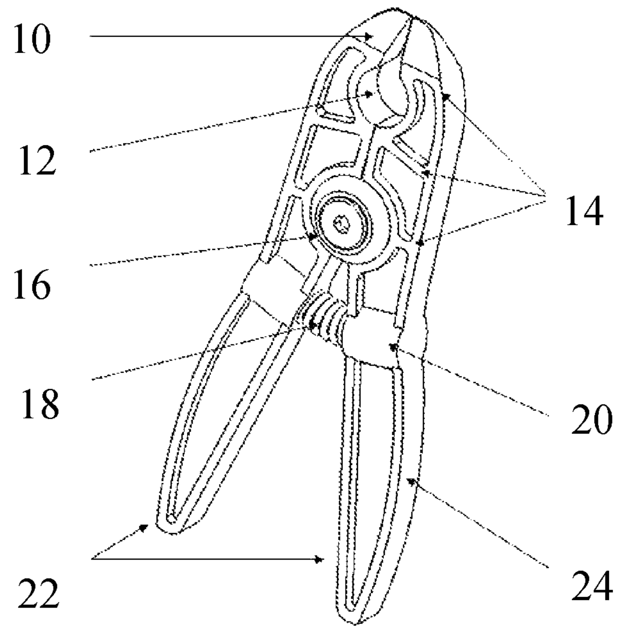
FIG. 2 illustrates another perspective view of the representative embodiment of FIG. 1 in a closed position.

FIG. 2 illustrates another perspective view of the representative embodiment of FIG. 1 in a closed position. In FIG. 2, the tool includes a sloped tip 10, a circular clamping bay 12, reinforcements 14 at engineered angles, a tool rotation point 16, a compression spring 18, spring holding compression cavities 20, left and right tool arms 22, and an I-beam reinforced structure 24. In some embodiments, circular clamping bay 12 includes an arc portion. In the illustrated embodiment, circular clamping bay 12 includes a first arc portion and a second arc portion. The sloped tip 10 allows for the tool to be used to pry. One such example is the ability to use the sloped tip 10 to pry up a recessed sprinkler riser by lifting between the nozzle lip and the external sprinkler housing of the sprinkler head, and then extending the riser above the external sprinkler housing. The circular clamping bay 12 allows for a location at which the tool is able to selectively secure the cylindrical body. In some embodiments, the arc of the arc portion does not need to be identical to the arc of the cylindrical body. Reinforcements 14 allow for increased securing pressure upon the cylindrical body. Tool rotation fulcrum point 16 allows for the tool to transition between a closed and an open position while transferring the spring tension to the clamping bay. As the left and right arms 22 are squeezed together, spring 18 is compressed and the tool is placed in an open position. As the left and right arms 22 separate from each other, the tool is placed in a closed position. Spring holding compression cavities 20 maintain the compression spring 18 between the compression cavities 20. The I-beam reinforced structure provides additional strength to the overall structure of the tool.

Figure 3:
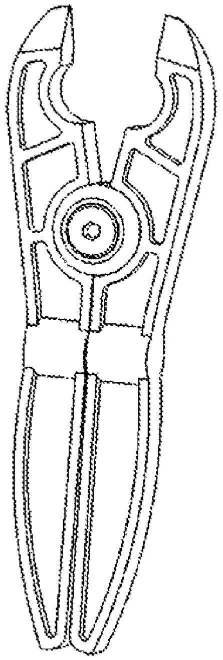
FIG. 3 illustrates a perspective view of the representative embodiment of FIG. 1 in an open position.

FIGS. 1-2 highlight the representative tool in a closed position, which can be used for storage or transportation of the tool. In an open position, for example as shown in FIG. 3, or some variance between fully open or fully closed, the tool can be used to secure a circular sprinkler riser or other cylindrical body. No manual adjustment to the tool is necessary for clamping a cylindrical body of any of a variety of cylindrical diameters. No significant training or precautions are necessary for safe and effective use of the tool. A user of the tool simply presses the angled tip of the tool 10 (FIG. 2), between the sprinkler riser nozzle lip and outer sprinkler body to begin raising the inner riser upward. The user then, opens the tool by squeezing the left and right handles/arms 22 together, moving the tool inward to the riser and releasing the left and right handles/arms 22 to clamp the riser within the circular clamping bay 12 (FIG. 2) of the tool. Completing this process provides access to and secures the riser, hands-free, allowing for quick and efficient maintenance and repair without the user being tethered to the sprinkler in a position of holding the riser upward.

Figure 4:
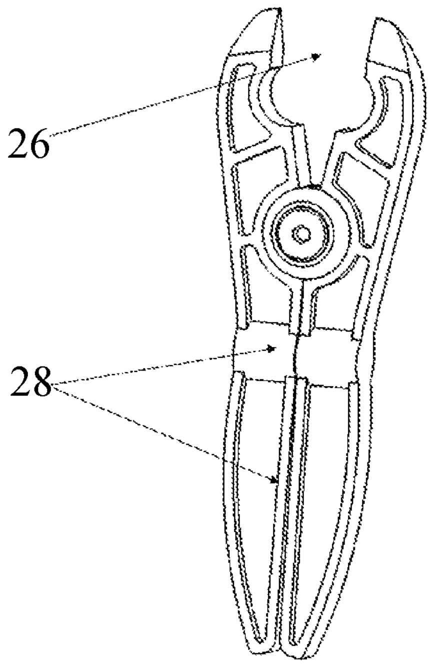
FIG. 4 illustrates another perspective view of the representative embodiment of FIG. 1 in an open position.

FIGS. 3-4 illustrate perspective views of the representative embodiment of FIG. 1 in an open position. The circular clamping bay is at a maximum opening 26 when the left and right handles/arms are in position 28. However, the representative tool can receive and retain any of a variety of cylindrical bodies with any of a variety of cylindrical dimensions.

Figure 5:
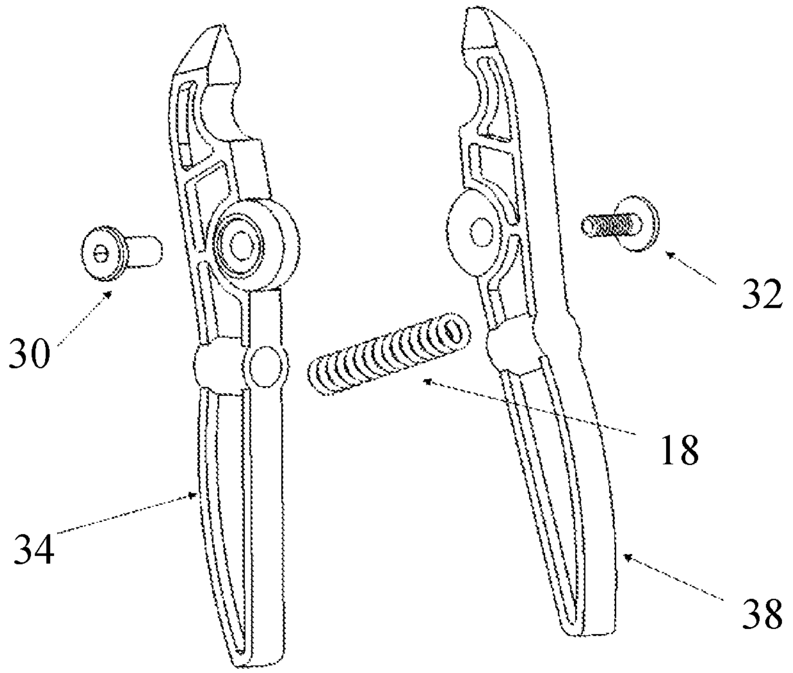
FIG. 5 illustrates an exploded view of the representative embodiment of FIG. 1.

With reference now to FIG. 5, an exploded view of the representative embodiment of FIG. 1 is shown. In FIG. 5, the tool comprises five individual components. Unique to the illustrated embodiment is the design of left arm 34 and right arm 38, and the assembly of all parts into one tool. In the illustrated embodiment, left arm 34 and right arm 38 are fabricated through an injection molding process with the use of a customized mold, including necessary core pulls to create the spring holding compression cavities 20. In some embodiments, the two parts comprise ABS and 15% fiberglass (G.F.) material. The two arms include an I-beam design around the outer edge and reinforcing ribs at engineered points. The combination of these characteristics creates the needed clamping strength and durability to selectively secure the cylindrical body. In some embodiments, the designed configuration of the two arms prevents an accidental or unintended removal of the tool from a cylindrical body.

Figure 6:
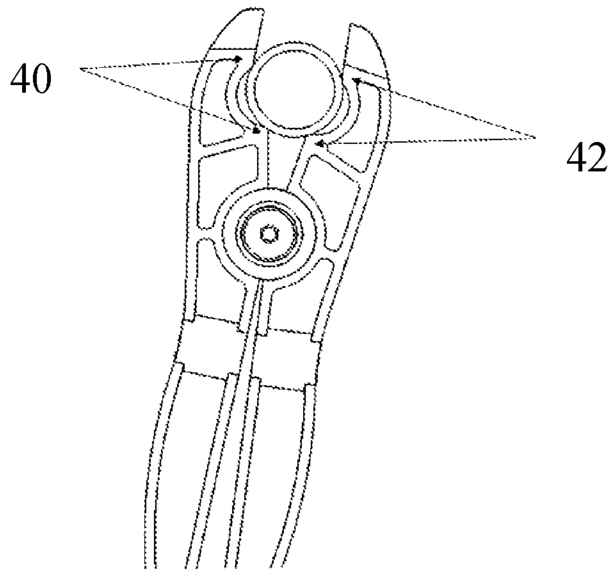
FIG. 6 illustrates perspective view of the representative embodiment of FIG. 1 securing a cylindrical body.

FIG. 6 illustrates perspective view of the representative embodiment of FIG. 1 securing a cylindrical body. In particular, FIG. 6 illustrates clamping points 40 and 42 as the four clamping points for a cylindrical body with a larger diameter.

Figure 7:
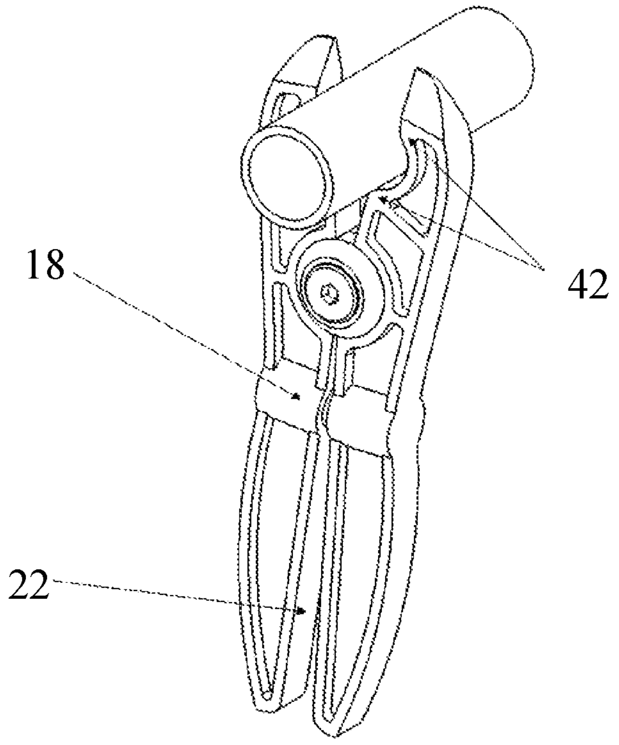
FIG. 7 illustrates another perspective view of the representative embodiment of FIG. 1 securing a cylindrical body.

In some embodiments, compression spring 18 provides an outward arm force and inward clamping bay pressure for securing the pop-up sprinkler riser in an upward or extended position from the outer sprinkler housing. The compression spring 18 shown in a semi-compressed state in FIG. 7, provides 50 lbs of pressure at a solid length of 1.26 inches. Those skilled in the art will appreciate that other embodiments embrace more or less pounds of pressure.

In some embodiments, the compression spring is closed and ground on the ends to provide a level contact point within the spring holding compression cavities 20 of the left and right arms 22. In some embodiments, the compression spring is zinc plated to prevent corrosion. In a further embodiment, the compression spring has a 0.081 inch outside diameter steel music wire.

In the illustrated embodiment, the tool rotates about a steel connector bolt, which includes female component 30 and male component 32 (FIG. 5). The circular rotation point 16 is reinforced for measured torque stress. The rotation of the arms does not rely on the outer edges of the rotating circle for balance. This provides a smooth open and close turn without adding a friction restriction to the compression spring capability. The steel connector bolt provides inward pressure from both sides to hold the tool together and prevents the two arms from teetering against one another.

In some embodiments, the tip 10 of the tool is sloped at about a 20-degree to a 40-degree angle from the tip rising to full thickness at the clamping bay. In one embodiment, the tip 10 is sloped at about a 25-degree angle from the tip rising to full thickness at the clamping bay. In another embodiment, the tip 10 is sloped at about a 30-degree angle from the tip rising to full thickness at the clamping bay. This degree allows an optimal lift point between the riser "lip" and the pop-up sprinkler outer housing. Additionally, the designed angle thickness provides the necessary size and strength for tool endurance over repeated use.

Figure 8:
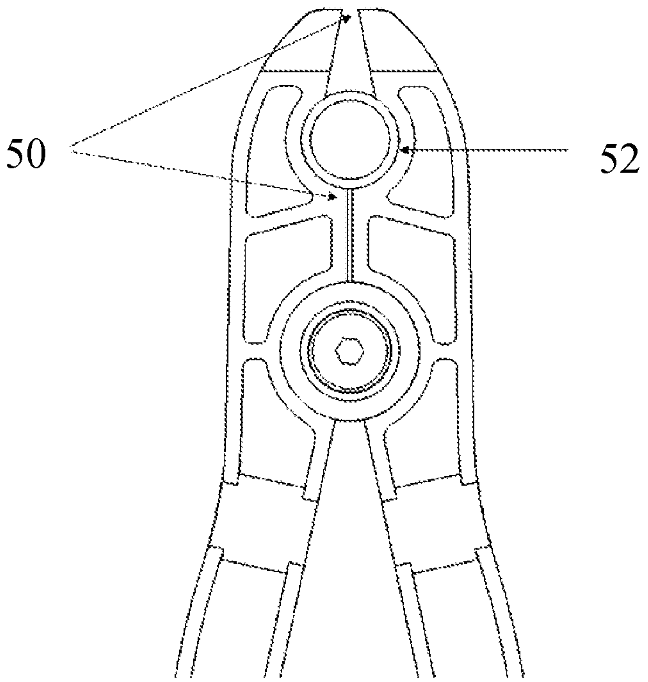
FIG. 8 illustrates another perspective view of the representative embodiment of FIG. 1 securing a cylindrical body.
Figure 9:
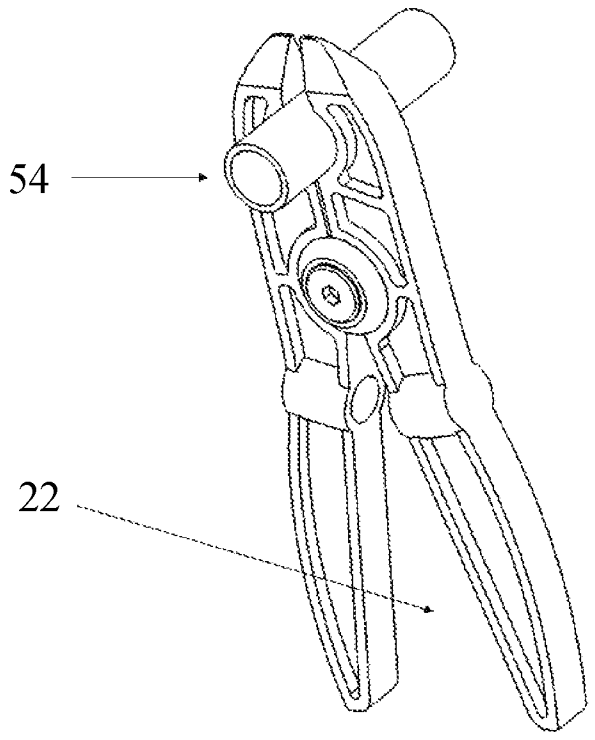
FIG. 9 illustrates another perspective view of the representative embodiment of FIG. 1 securing a cylindrical body.

Embodiments of the invention provide diversity in the use of varying clamping diameters between the smaller pop-up sprinklers of 0.785 inches to the medium sized pop up of 1.168 inches. The circular clamping area 12 includes a first arc portion and a second arc portion and provides clamping of the diameters with the higher end of this range secured by four designed contact points, 40 and 42 (FIG. 6). The designated points are reinforced by designed ribs. Diameters closer to the low end of the range are secured within the same clamping bay 52 (FIG. 8) by utilizing maximum contact surface area. To support clamping access for a large diameter, a balance was engineered between the maximum opening distance 26 (FIG. 3) of 1.25 inches and both the solid length of the compression spring and contact between the two tool arms 28 (FIG. 4). Achieving this balance provides a two-in-one flexibility, as a single clamping bay can hold radius dimensions between 0.785 inches and 1.168 inches. The smaller diameter is clamped using maximum surface area of the clamping bay 52 (FIG. 8). A critical point of achieving this surface area is to prevent any type of restriction at the tool tip or at the base of the clamping bay 50 (FIG. 8). Preventing this type of restriction allows for full compression spring force transfer to the clamping bay and securing the smaller diameter 54 (FIG. 9) with the tool arms in a near fully open position 56 (FIG. 9).

Thus, as discussed herein, embodiments of the present invention embrace systems and methods for selectively securing a cylindrical body. In particular, at least some implementations of the present invention relate to a device that is configured to selectively provide access to and/or secure a cylindrical riser of a pressurized pop-up water sprinkler head to allow for the adjustment and/or replacement of a sprinkler component, such as a filter and/or nozzle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A sprinkler tool comprising:

a first tool arm; and a second tool arm that is coupled to the first tool arm such that when a first end portion of the first tool arm and a first end portion of the second tool arm are moved closer together, a second end portion of the first tool arm and a second end portion of the second tool arm are moved further apart, wherein the second end portion of the first tool arm defines a first contact surface that is configured to frictionally engage a portion of a cylindrical sprinkler riser of a pressurized pop-up sprinkler to selectively clamp the portion of the cylindrical sprinkler riser in the sprinkler tool, and wherein at least one of (i) the second end portion of the first tool arm and (ii) the second end portion of the second tool arm comprises a first sloped tip having a wedge-shaped portion that is configured to be wedged between a sprinkler riser nozzle lip and an outer sprinkler body of the pressurized pop-up sprinkler to extract the cylindrical sprinkler riser from the outer sprinkler body.

2. The sprinkler tool of claim 1, wherein the first sloped tip is sloped at an angle that is between about twenty degrees and about forty degrees.

3. The sprinkler tool of claim 1, wherein the first contact surface comprises a circular arc having a radius of at least 0.3925 inches.

4. The sprinkler tool of claim 1, wherein the first contact surface of the first tool arm has a first contact point and a second contact point, with the first and second contact points being configured to contact a perimeter of the cylindrical sprinkler riser when a radius of the cylindrical sprinkler riser is larger than a radius of the first contact surface.

5. The sprinkler tool of claim 4, wherein a perimeter of the first arm tool comprises an I-beam reinforced structure, and wherein the sprinkler tool further comprises a first raised reinforcing rib that extends from a first portion of the I-beam reinforced structure to the first contact point.

6. The sprinkler tool of claim 5, further comprising a second raised reinforcing rib that extends from a second portion of the I-beam reinforced structure to the second contact point.

7. The sprinkler tool of claim 1, wherein a perimeter of the first arm tool comprises an I-beam reinforced structure.

8. The sprinkler tool of claim 1, wherein the first tool arm comprises a first spring holding compression cavity that receives a first portion of a compression spring, wherein the second tool arm comprises a second spring holding compression cavity that receives a second portion of the compression spring, and wherein the first and second spring holding compression cavities are each disposed proximal to a fulcrum point.

9. The sprinkler tool of claim 1, wherein the first and second tool arms each comprise ABS plastic and fiberglass.

* * * * *